US012768744B2

(12) United States Patent
Mueller et al.

(10) Patent No.: US 12,768,744 B2
(45) Date of Patent: Oct. 20, 2026

(54) TESTING APPARATUS AND METHOD FOR TESTING A SENSOR, SENSOR SYSTEM

(71) Applicant: Robert Bosch GmbH, Stuttgart (DE)

(72) Inventors: Juergen Mueller, Ofterdingen (DE); Dominik Messner, Schoemberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 425 days.

(21) Appl. No.: 18/181,954

(22) Filed: Mar. 10, 2023

(65) Prior Publication Data

US 2023/0296470 A1 Sep. 21, 2023

(30) Foreign Application Priority Data

Mar. 16, 2022 (DE) ..................... 10 2022 202 581.4

(51) Int. Cl.

*G01M 7/00* (2006.01)
*G01D 18/00* (2006.01)
*G01P 21/00* (2006.01)

(52) U.S. Cl.

CPC .............. *G01M 7/00* (2013.01); *G01D 18/00* (2013.01); *G01P 21/00* (2013.01)

(58) Field of Classification Search

CPC ...... G01P 15/02; G01P 15/0802; G01P 15/18; G01P 15/08; G01P 21/00; G01D 18/00; G01M 7/00

See application file for complete search history.

(56) References Cited

U.S. PATENT DOCUMENTS

| | | | | |
|---|---|---|---|---|
| 5,294,890 | A * | 3/1994 | Hemminger ....... | G01R 31/2829 324/718 |
| 5,457,982 | A * | 10/1995 | Spies .................. | B60R 21/0132 73/1.38 |
| 6,308,554 | B1 * | 10/2001 | Mattes .................... | G01P 21/00 73/1.37 |
| 2005/0016273 | A1 * | 1/2005 | Murata ................. | G01P 15/125 73/514.32 |
| 2008/0141759 | A1 * | 6/2008 | Reinert ................. | G01M 3/186 73/40 |
| 2010/0139373 | A1 * | 6/2010 | Braman .................. | G01P 1/023 73/40.7 |
| 2010/0154517 | A1 * | 6/2010 | Sammoura ............ | G01M 3/226 73/49.3 |
| 2013/0205866 | A1 * | 8/2013 | Brockhaus ............. | G01D 18/00 73/1.01 |

(Continued)

FOREIGN PATENT DOCUMENTS

| | | | |
|---|---|---|---|
| DE | 102005037634 | A1 | 2/2007 |
| DE | 102009028173 | A1 | 2/2011 |

(Continued)

*Primary Examiner* — Helen C Kwok

(74) *Attorney, Agent, or Firm* — NORTON ROSE FULBRIGHT US LLP

(57) ABSTRACT

A testing apparatus and a testing method for a sensor, in particular a sensor having a PT2 behavior. Provision is made to alternately excite the sensor with an excitation signal and then read the sensor. By varying the ratio of the time periods between the excitation and reading of the sensor, characteristic properties of the sensor, such as damping behavior, frequency response or the like, may be ascertained.

10 Claims, 3 Drawing Sheets

(56) References Cited

U.S. PATENT DOCUMENTS

| | | | | |
|---|---|---|---|---|
| 2014/0059397 | A1* | 2/2014 | Barker, Jr. | H04W 24/06 714/E11.148 |
| 2014/0250971 | A1* | 9/2014 | Fang | G01P 15/125 73/1.37 |
| 2014/0260515 | A1* | 9/2014 | Hazel | G01P 21/00 73/1.38 |
| 2016/0103174 | A1* | 4/2016 | Aaltonen | G01P 15/125 324/750.3 |
| 2016/0202286 | A1* | 7/2016 | Aaltonen | G01D 18/00 73/1.38 |
| 2018/0284190 | A1 | 10/2018 | Bilbao de Mendizabal et al. | |
| 2020/0278332 | A1* | 9/2020 | Schlichte | G01N 33/0006 |
| 2020/0309846 | A1* | 10/2020 | Barthel | G01R 23/14 |
| 2020/0408805 | A1* | 12/2020 | Hu | G01P 15/18 |
| 2021/0364546 | A1* | 11/2021 | Hughes | B81C 99/0045 |
| 2023/0128205 | A1* | 4/2023 | Garbarino | G01P 15/125 73/1.38 |

FOREIGN PATENT DOCUMENTS

| | | | |
|---|---|---|---|
| DE | 102012200929 | B4 | 10/2020 |
| WO | WO-2019120789 | A1 * | 6/2019 |

* cited by examiner

TESTING APPARATUS AND METHOD FOR TESTING A SENSOR, SENSOR SYSTEM

CROSS REFERENCE

The present application claims the benefit under 35 U.S.C. § 119 of German Patent Application No. DE 10 2022 202 581.4 filed on Mar. 16, 2022, which is expressly incorporated herein by reference in its entirety.

FIELD

The present invention relates to a testing apparatus and a method for testing a sensor and to a sensor system.

BACKGROUND INFORMATION

Sensors may be used, for example, to provide an output signal which corresponds to a physical variable. For instance, a current or voltage signal which corresponds to the monitored physical variable may be provided as an output variable. In the course of ongoing development, the use of sensors having micro-electromechanical systems (MEMS) is increasing.

German Patent No. DE 10 2012 200 929 B4, for example, describes a micro-mechanical acceleration sensor and a corresponding manufacturing method.

The sensor systems used herein may have a PT2 frequency characteristic, for instance, with a corresponding resonance frequency and damping constant. The measurement of such system properties is highly important and has hitherto involved significant effort. In particular, precise characterization of the system properties during the life cycle of these components was hitherto only possible with great effort, if at all.

SUMMARY

The present invention relates to a testing apparatus for a sensor, a sensor system, and a method for testing a sensor. Specific example embodiments of the present invention are disclosed herein.

According to an example embodiment of the present invention, provided is:

- a testing apparatus for a sensor, having a control device which is designed to supply test signals to the sensor. The control device is furthermore designed to read the sensor after the test signals have been supplied to the sensor. A sensor value may thus be ascertained. The control device is, in particular, designed to supply the test signal to the sensor multiple times in succession for a predetermined first time period in each case and to subsequently read the sensor during a predetermined second time period. The control device is further designed to vary the first predetermined time period for supplying the test signal to the sensor. The control device is furthermore designed to ascertain corresponding sensor values for at least two different first time periods in each case. Finally, the control device is designed to determine a state value of the sensor using the ascertained sensor values for at least two different first time periods.

Furthermore provided according to an example embodiment of the present invention is:

- a sensor system having a testing apparatus according to the present invention and a sensor. The sensor here is designed to provide an output signal which corresponds to a physical parameter.

According to an example embodiment of the present invention, provided is:

- a method for testing a sensor, having a step for alternately supplying a test signal to the sensor and reading the sensor to ascertain a sensor value. The method furthermore comprises a step for determining a state value of the sensor. The state value is determined in particular using the ascertained sensor values. In this context, the test signal is supplied to the sensor multiple times in succession for a predetermined first time period in each case and the sensor is subsequently read during a predetermined second time period. The first predetermined time period for supplying the test signal to the sensor may be varied here so that corresponding sensor values are ascertained for at least two different first time periods in each case. Accordingly, the state value of the sensor may be ascertained using the ascertained sensor values for at least two different first time periods.

The present invention is based on the finding that sensor systems, in particular sensor systems based on MEMS, may have a relatively complex frequency-dependent system behavior, such as a PT2 frequency characteristic. However, ascertaining characteristic parameters such as resonance frequency and damping constant in a conventional way may require considerable expenditure on equipment. On the other hand, information regarding the properties of the sensor, such as aging effects, damage or the like, may be acquired from this frequency characteristic and, in particular, from a change in the frequency characteristic over the useful life.

One feature of the present invention, therefore, is to take this finding into account and to create a simple and reliable way of determining characteristic properties of a sensor system, in particular a sensor system which, at least to some extent, has a relatively complex system behavior, such as PT2 properties. In this way, it is possible for these characteristic properties of the sensor, such as the frequency response or parameters which characterize the frequency response, to be ascertained and analyzed over the useful life and, in particular, in a normal operating environment. In this way, changes at the sensor, such as aging effects, damage and other properties which may result in unreliable or inaccurate sensor values, may be detected at an early stage without having to implement changes at the sensor system or carry out a complex measurement using additional components.

To this end, the present invention takes advantage of the fact that provision is generally already made to excite a sensor via an external signal and to analyze a sensor signal resulting from this excitation to calibrate the sensor during an initialization phase, for example. According to the present invention, at least one parameter is then varied during the excitation of the sensor and the resultant sensor signal is subsequently analyzed for different excitations in each case. System properties of the sensor, such as characteristic parameters of a frequency response or the like, may therefore be inferred from the connection between the variation of the excitation signal and the resultant sensor values. In contrast to conventional approaches, which generally observe only static states of a sensor, a particular aspect of the present invention is to carry out further characterization, such as the measurement of a complex frequency behavior or the like, by analyzing dynamic properties at the sensor.

To excite the sensor, an appropriate excitation signal, for example a predetermined electric voltage, may be supplied to the sensor, for example, for the predetermined first time period in each case. After this excitation, the sensor may subsequently be read during a second time period, whereby a sensor value resulting from the excitation at the sensor is ascertained. To read the sensor, a resultant electric voltage may be read, for example, or a property, such as resultant capacitive values of the sensor, may be ascertained. It goes without saying that the reading of the sensor may also take place in any other suitable manner, depending on the particular sensor.

The second time period for the reading of the sensor may be selected to be the same in each case. The first time period for the excitation of the sensor, on the other hand, may be varied so that corresponding different sensor values may be ascertained for different first time periods in each case. Conclusions regarding the properties of the sensor may therefore be drawn from the connection between the respective first time period for the excitation of the sensor and the resultant sensor values. For example, characteristic parameters for ascertaining the frequency response of the sensor may be determined.

To ascertain the characteristic sensor properties, such as the frequency response or the like, the static calibration which, if necessary, is also provided in conventional systems may be expanded such that different time schedules for the excitation and measurement phase may be applied in succession. As a result, not only may a static system behavior be analyzed, but the dynamic properties of the sensor may also be evaluated, in particular using a mathematical sensor model or the like.

In particular, in sensors having a characteristic similar to PT2, the ascertained resultant sensor value may vary significantly depending on the first time period for the excitation of the sensor. This property may therefore be used to check the sensor.

The properties of a sensor may change over the useful life due to aging effects, damage or the like. For example, if a sensor comprises a cavity in the form of an enclosed space containing a medium, leaks may occur due to damage or the like. In this way, at least some of the medium may escape under positive pressure conditions or gas may penetrate into this cavity from the outside under negative pressure conditions. This may alter the sensor properties, such as the damping properties of the sensor signal. As a result of the testing method according to the present invention, it is possible to detect such alterations to the sensor properties at an early stage and, for example, to infer damage or the like therefrom.

Since a change in the sensor properties may thus be detected in a simple and reliable manner, malfunctions of the sensor may be identified and, if necessary, appropriate countermeasures initiated. For example, in safety-relevant systems, an appropriate emergency shutdown or a switch to a safer operating mode may be carried out. If applicable, damage or aging of the sensor may also be identified at an early enough stage to enable continued operation for a temporary, limited period in some situations. Therefore, the system may continue to operate during this limited period, and, if necessary, a safer operating state may be initiated.

According to a specific embodiment of the present invention, the control device is designed to provide a predetermined electric voltage at the sensor to excite the sensor. In this way, for example, by setting a potential difference between two elements of the sensor, the sensor may experience an excitation or deflection of the sensor element. Moreover, depending on the sensor type, any other type of sensor excitation is possible, for example by providing a predetermined electric current or generating an electric and/or magnetic field.

According to a specific embodiment of the present invention, the control device is designed to ascertain a damping property of the sensor using the ascertained sensor values for at least two different first time periods. If at least two different time schedules are provided for analyzing the sensor, this is already sufficient to ascertain the characteristic parameters of a PT2-type behavior, for example. In particular, for instance, a damping constant and possibly also a resonance frequency of the sensor may be ascertained. Sensors having a PT2-type behavior may be characterized by parameters such as damping constant and possibly resonance frequency. In this context, a change in the damping constant may point to a change in the sensor, for instance. By using more than two different time schedules, it is moreover also possible to ascertain further parameters of the sensor system, if necessary. In addition or alternatively, when using more than two different time schedules, the measuring uncertainty may also be reduced and the accuracy thereby increased. Furthermore, a more complex frequency behavior may be evaluated as the number of different time schedules increases. In this way, it is possible to identify aging effects or damage to the sensor at an early stage.

According to a specific embodiment of the present invention, the control device is designed to adjust an operating parameter of the sensor using the ascertained sensor values for at least two different first time periods. For example, a calibration factor or another value for the sensor calibration or the output signals provided by the sensor may be calculated from the ascertained sensor values for different first time periods. Moreover, for example, parameters such as an electric voltage which is applied to the sensor during the normal sensor operation or any further suitable operating parameters of the sensor may also be adjusted during the sensor operation depending on a previously carried-out analysis with a plurality of different first time periods.

According to a specific embodiment of the present invention, the control device comprises an application-specific integrated circuit (ASIC). In this way, the testing of the sensor may be realized in a particularly, simple, compact and cost-effective manner via the above-described excitation with a plurality of different first time periods. In particular, an ASIC may also be used, for example, which also activates or analyzes the sensor during the normal sensor operation.

According to a specific embodiment of the present invention, the sensor comprises a micro-electromechanical system (MEMS). A particularly compact sensor system may be realized using such sensors. Accordingly, as a result of testing of the sensor according to the present invention, in particular based on an ASIC, a compact system may be realized which enables calibration and testing of the MEMS sensor.

According to a specific embodiment of the present invention, the sensor comprises an acceleration sensor. In particular, the acceleration sensor may be, for example, an acceleration sensor based on a MEMS.

According to a specific embodiment of the present invention, the sensor comprises a space filled with a medium. For example, the sensor may comprise an enclosed sensor space which is filled with a gas. In this context, there may be a positive or negative pressure in the enclosed space. This enables the damping properties of a sensor element within this space to be set via the medium and the prevailing pressure. In this case, the testing apparatus may be designed to detect a leak in the space filled with the medium. In the case of a leak, the medium may escape from the space under positive pressure conditions or ambient air may penetrate into the space under negative pressure conditions. This may alter the damping properties of a sensor element in the space, which may be detected by the testing apparatus according to the present invention.

The above configurations and developments can be combined in any manner, to the extent that this is reasonable. Further configurations, developments and implementations of the present invention also comprise combinations of features of the present invention not explicitly mentioned, which are described above or which are described below with respect to the exemplary embodiments. In particular, a person skilled in the art will also add individual aspects as improvements or additions to the respective basic forms of the present invention.

BRIEF DESCRIPTION OF THE DRAWINGS

Further features and advantages of the present invention are explained below with reference to the figures.

In the figures, the same reference signs denote equivalent or functionally equivalent components, unless indicated otherwise.

DETAILED DESCRIPTION OF EXAMPLE EMBODIMENTS

Figure 1:
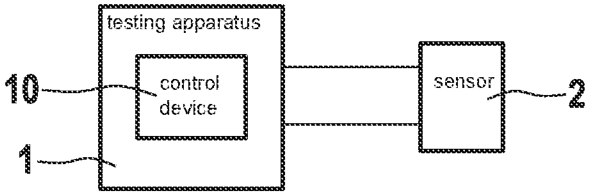
FIG. 1 shows a schematic illustration of a block diagram of a sensor system having a testing apparatus according to a specific embodiment of the present invention.

FIG. 1 shows a schematic illustration of a block diagram of a sensor system having a testing apparatus 1 according to a specific embodiment. In addition to the testing apparatus 1, the sensor system comprises a sensor 2. The sensor 2 may essentially be any sensor which delivers an output signal which corresponds to a sensor-detected variable. In particular, the sensor 2 may be a sensor which has a PT2-type characteristic when detecting the sensor-detected variable. For example, the sensor may comprise a mass element which is deflected according to a sensor-detected value. In this context, a sensor system having a PT2-type behavior may be formed by the mass of the sensor element and the resetting forces acting on the deflected sensor element. If necessary, sensors 2 having a more complex system behavior, in particular a frequency response, which is characterized by higher-level parameterization, are also possible.

For instance, the sensor may be an acceleration sensor, in which a sensor element is deflected by an acceleration acting on the sensor. The sensor element here may be located in an enclosed space, for example, which is filled with a medium. For instance, the sensor element may be located in a cavity containing a gas. During a deflection, the movement of the sensor element here may be damped by the medium located in the cavity. The damping property of the sensor element here may be influenced by the pressure of the medium in the cavity containing the sensor element. In this context, in the event of damage to the sensor and an associated leak in the cavity containing the damping medium, the medium might escape under positive pressure conditions or ambient air may penetrate into the cavity under negative pressure conditions. This might change the damping properties of the sensor element. Damage or aging of the sensor may frequently be inferred from the altered damping properties.

To ascertain the damping properties and/or possibly further parameters characterizing the sensor, a testing apparatus 1 may be provided at the sensor system. This testing apparatus 1 may check the functionality of the sensor 2 during initialization or at predetermined time intervals, for example. In this context, for example, the above-described damping properties of a PT2-type system or any further parameters characterizing the sensor may be ascertained. Moreover, it is also possible, for example, to ascertain calibration parameters or the like. In particular, measured variables and/or data of the testing procedure for the sensor may also be used for calibration, or the testing of the sensor may be carried out together with a calibration procedure.

To check the sensor 2, a control device 10 may be provided in the testing apparatus 1. This control device 10 may supply test signals to the sensor, for example. The control device may subsequently read the sensor 2 and thus ascertain a sensor value. To excite the sensor 2, the control device 10 may, for example, provide an excitation signal at the sensor 2 for a predetermined first duration. This excitation signal may be an excitation with a predetermined electric voltage, for example. However, it goes without saying that, depending on the sensor, any other suitable excitation signals are also possible.

As stated above, such an excitation of the sensor 2 may take place for a predetermined first time period t1. Immediately after this, the sensor may be read for a second time period. In this context, for example, a sensor element in the sensor 2 may be deflected during the excitation by the provided excitation signal. The sensor 2 may subsequently be read during the second time period t2 to ascertain a sensor signal which corresponds to the deflection of the sensor element. From this, a sensor value which corresponds to the ascertained sensor signal may be determined. The first time period t1, during which the sensor 2 is excited by the excitation signal, is preferably substantially longer than the second time period t2, during which the sensor 2 is read. This procedure of exciting the sensor 2 for a first time period t1 and subsequently reading the sensor 2 for a second time period t2 may be repeated multiple times. This results in a periodic sequence, in which the sensor 2 is alternately excited for the first time period t1 and then read during the second time period t2. An at least approximately stationary value for the read out signal and for the sensor value corresponding thereto is produced after a plurality of alternating excitation and readout periods.

This procedure of alternately exciting the sensor 2 for a first time period t1 and then reading the sensor for a second time period t2 may be carried out with a plurality of different first time periods t1. This results in different ratios between the excitation period and the readout period in each case. Accordingly, different values may arise in the resultant stationary value for the respective sensor value.

Since the sensor element of the sensor 2 is deflected during the first, excitation time period t1 and, owing to the resetting forces acting on the sensor element, the sensor element is subsequently reset during the second, readout time period t2, the damping properties of the sensor 2 which are present in the sensor 2 may be inferred by varying the first time periods for the excitation of the sensor. This is illustrated in greater detail by the explanations below.

Figure 2:
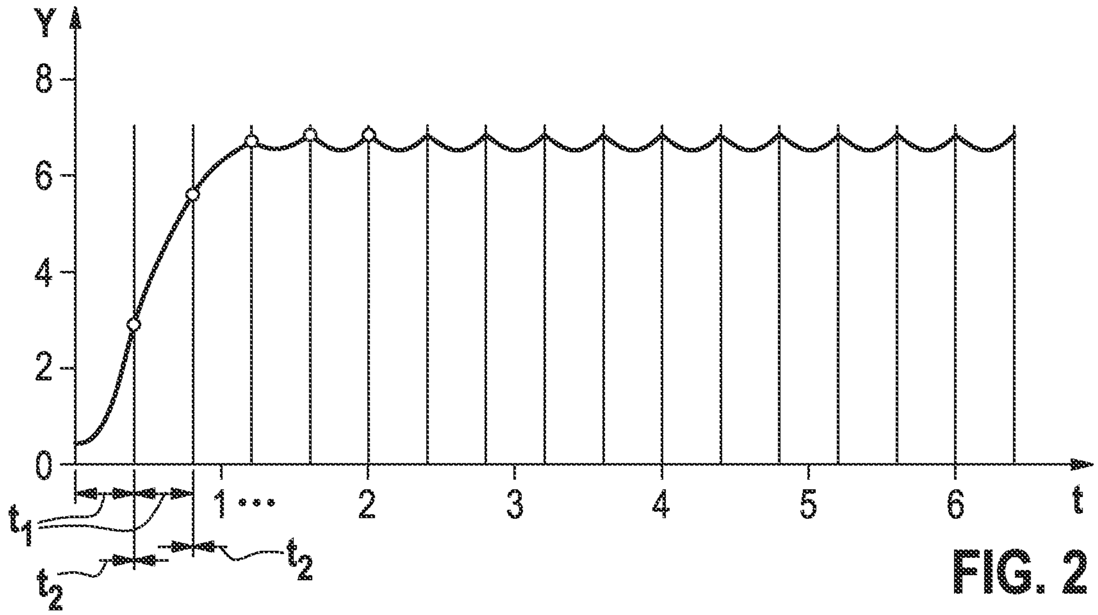
FIG. 2 shows a time graph for the excitation and readout intervals for testing a sensor according to a specific embodiment of the present invention.

FIG. 2 shows a schematic illustration of a signal-time graph for the excitation and reading of a sensor 2 according to a specific embodiment. The t-axis here represents the time progression and the Y-axis represents a value or state of the sensor element resulting from the excitation. In this context, as already described above, external excitation of the sensor 2 takes place during first time intervals t1 in each case via a corresponding signal from the testing apparatus 1. Reading of the sensor 2 takes place during the second time intervals t2. Excitation of the sensor 2 via an excitation signal does not take place during this reading of the sensor 2 here.

As can be seen in FIG. 2, the excitation of the sensor 2 and the reading of the sensor 2 take place a plurality of times in alternating succession. The time intervals t1 for the excitation of the sensor 2 are preferably significantly greater than the time intervals t2 for the reading of the sensor 2 here.

As can further be seen in FIG. 2, there is initially a phase during which the sensor signal, or the corresponding sensor value, increases due to the excitation of the sensor 2. After some time, i.e. a plurality of excitation and readout periods, an at least approximately stationary state is subsequently established, in which, after an excitation of the sensor 2, an at least approximately identical value for the sensor signal may be read out in each case, resulting in an at least approximately identical sensor value, The excitation of the sensor 2 during the first time interval t1 and the reading of the sensor 2 during the second time interval t2 therefore represents a periodic external excitation of a mechanical system which is capable of vibration. According to classical mechanics, these systems react to this with a periodic movement at the respective excitation frequency. The amplitude and a phase delay between the periodic movement of the system and the respective excitation signal is explained here by Newton's Mechanics and may be described, for example, by a corresponding mathematical model. Such mathematical modeling enables both a mean vibration level for the sensor 2, or the output sensor signal, and the amplitude (i.e. the maximum value) of the oscillations to be determined. Moreover, if applicable, higher harmonic vibration values may also be ascertained using such a mathematical model.

For the characterization of the sensor 2, theoretically ascertained values, such as the static level and the amplitude, may in turn be determined as expected values. For example, the above-mentioned mathematical model may be used for this purpose.

Furthermore, a measured value of a current amplitude at a known phase point may be ascertained via the described measurement with the excitation phase t1 and the readout phase t2. For example, if the sensor 2 is excited at a frequency which is sufficiently higher than a resonance frequency of the system, for example a PT2 system, it may be assumed that the system is in a state with a 180° opposite phase.

If a plurality of such measurements are carried out at different excitation frequencies, at least one of the time intervals t1 and/or t2 therefore varies so that a frequency response of the system may thus be ascertained. For example, a Bode amplitude graph or the like may thus be generated. This enables conclusions to be drawn regarding the frequency response and/or phase response, damping or the like.

For example, to determine the characteristic properties of the sensor 2, known or predetermined positions may be applied on a theoretically ascertained curve and the ascertained measured values may be compared to the theoretical values. Moreover, any other suitable approaches for ascertaining the characteristic properties of the sensor on the basis of a plurality of measured values with different settings for the excitation time interval t1 and readout time interval t2 are also possible. The precision may be increased as the number of different settings for t1 and/or t2 increases. Moreover, with more than two different settings, more complicated frequency responses, which have a plurality of resonance points, for instance, may also be reconstructed.

Figure 3:
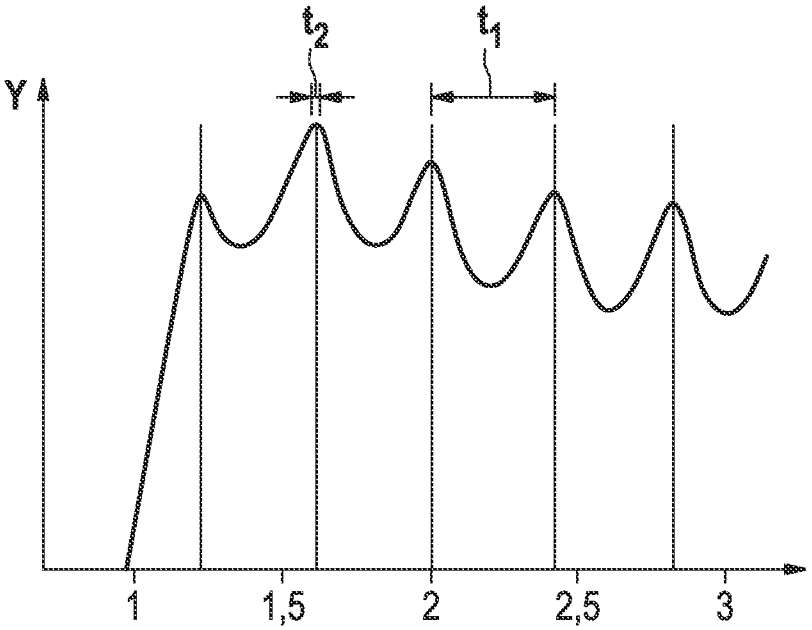
FIG. 3 shows an enlargement of a region of the graph of FIG. 2.

FIG. 3 shows a more detailed view of part of the progression of an excited sensor element or the sensor value corresponding thereto. This clearly shows that, at the start of the excitation, the resultant sensor signal initially increases in each case at the readout time intervals t2 and then levels off to an approximately stationary value over time. To determine the sensor properties according to the present invention, the measurement here only takes place after the virtually stationary state is achieved.

As mentioned above, the ratio between the excitation time period t1 and the readout time period t2 may be varied by varying the first time intervals t1 for the excitation of the sensor 2. The time interval t2 for the readout will generally be kept constant here in each case. However, in addition to the time interval t1 for the excitation of the sensor 2, it is essentially also possible to also vary the time interval t2 for the reading of the sensor. By varying the ratio between t1 and t2, it is possible to include the influence on the resultant mean deflection of the sensor element in the sensor 2. This then initially results in a sensor value which corresponds to the respective ratio t1:t2. Moreover, the variation of the excitation time period t1 and, if applicable, the readout time period t2 also results in a variation of the excitation cycle duration, i.e. the time t1+t2, and therefore the excitation frequency. This property may therefore be used to excite the sensor system with different frequencies and to analyze the resultant values from the sensor.

Figure 4:
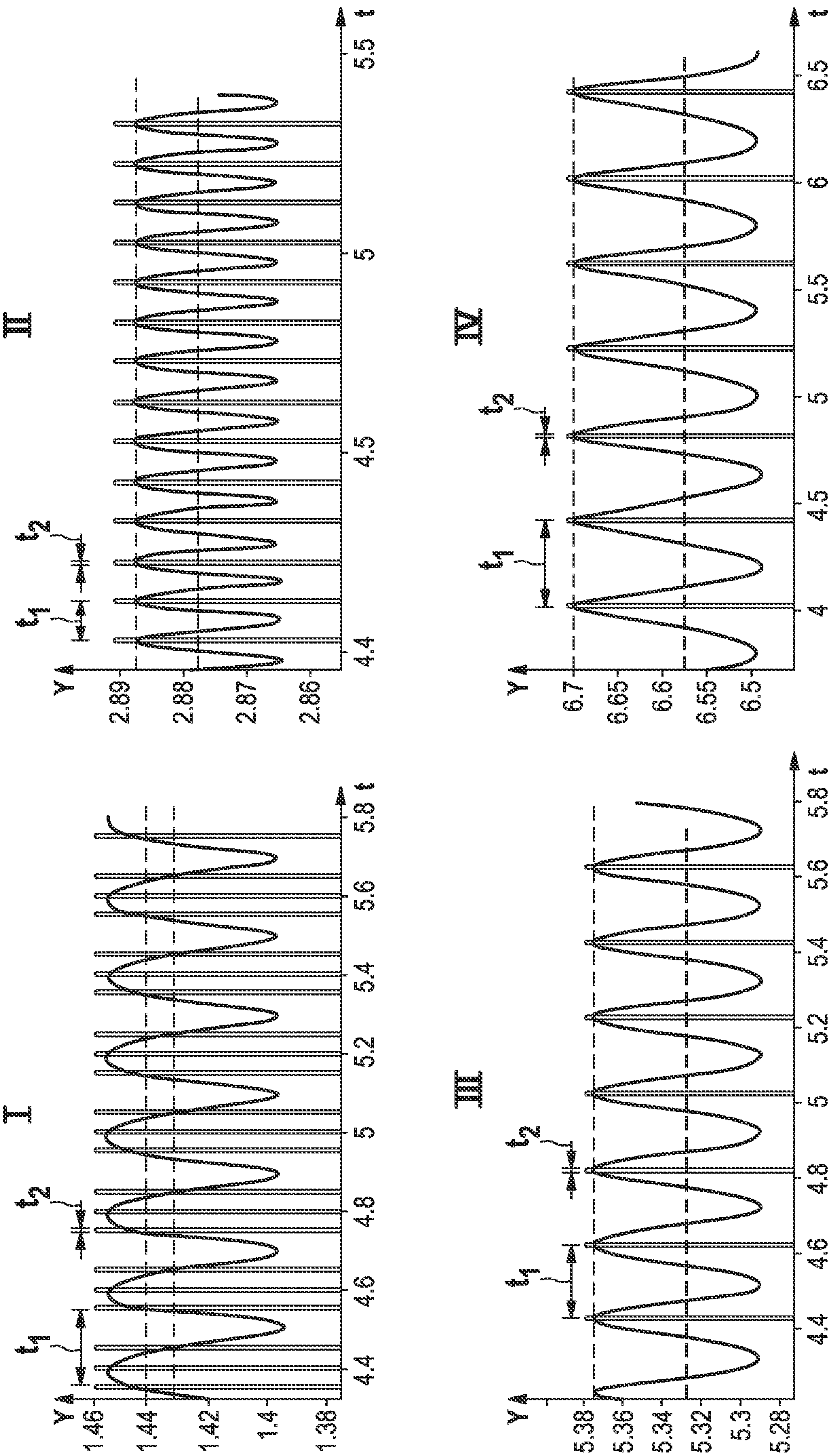
FIG. 4 show time graphs for illustrating different excitation time intervals for testing a sensor according to a specific embodiment of the present invention.

FIG. 4 illustrates the variation of the time intervals t1 for the excitation of the sensor 2 and the resultant readout values. As shown here, different excitation time periods t1 and resultant different ratios t1:t2 between the excitation time period t1 and the readout time period t2 or the resultant cycle duration t1+t2 produce a different readout value as a resultant sensor value in each case.

The above-described checking of the sensor 2, for example, during initialization of the sensor system, may be carried out at the outset, for example when activating or starting up the sensor system. Moreover, such checking is also possible periodically, at predetermined time intervals, for example.

During conventional initialization of a sensor 2, the sensor system is generally checked with a single excitation time period t1 and a single readout time period t2 and, on the basis thereof, the established stationary sensor is compared to a predetermined reference value, or, if necessary, a simple adjustment of the sensor system is carried out on the basis of the established stationary value; however, by evaluating the sensor system according to the present invention and ascertaining characteristic variables, such as frequency response, damping, resonance frequency etc., much more precise and informative checking of the sensor system may take place. Moreover, if calibration of the sensor system is required, this may also take place in a much more precise manner based on the characteristic variables ascertained according to the present invention.

In this regard, for example, aging effects, damage, such as leaks, or the like, may already be identified at a very early stage on the basis of the characteristic variables which describe the vibration or damping behavior of the sensor system.

If the sensor element of a sensor 2 is operated in a cavity with positive pressure or negative pressure, for example, the positive pressure may escape in the event of damage to this cavity or, under negative pressure conditions, ambient air may flow into the cavity. By changing the gas pressure in the cavity, the damping of the sensor element here will change. Likewise, substances diffusing into the cavity, for example, may influence the damping and/or frequency properties of the sensor. Ascertaining characteristic variables which describe this behavior, or at least depend on this damping behavior, according to the present invention therefore enables such damage to the sensor to be detected at an early stage. Therefore, by evaluating such a dynamic property, for example the damping behavior of a frequency response, substantially more precise and informative checking and, if necessary, also a calibration of the sensor system may take place. In contrast, conventional methods for this, which only check a single static deflection value of a sensor, are not capable of ascertaining such dynamic properties of the sensor system and drawing corresponding conclusions regarding the sensor system.

Owing to this significantly improved informative value and also accuracy of the characterization of a sensor system, in particular also due to the conclusions drawn regarding dynamic properties, such as frequency response, damping behavior etc., the method according to the present invention is also particularly suitable for use in safety-relevant systems.

In particular, in safety-relevant arrangements, for instance in safety-relevant components of a motor vehicle, for example in connection with a driver assistance system, appropriate measures may be initiated in the event of deviations in the ascertained characteristic properties of the sensor 2. For example, a safety-relevant system may be switched to a safer operating state. If necessary, an emergency shutdown may also be carried out. Moreover, in systems having redundant sensors, defective sensors may be identified via the above-described checking of the sensor, so that, in redundant systems, at least temporary operation may continue using only the sensors which are still classed as functional.

Since the described change in the damping behavior may already point to a possible malfunction of a sensor 2 at a very early stage, after a deviation between the ascertained characteristic properties and predetermined tolerance ranges, it is also possible, if necessary, to continue at least limited operation of a system, at least temporarily, until a sensor which is identified as defective may be replaced.

Figure 5:
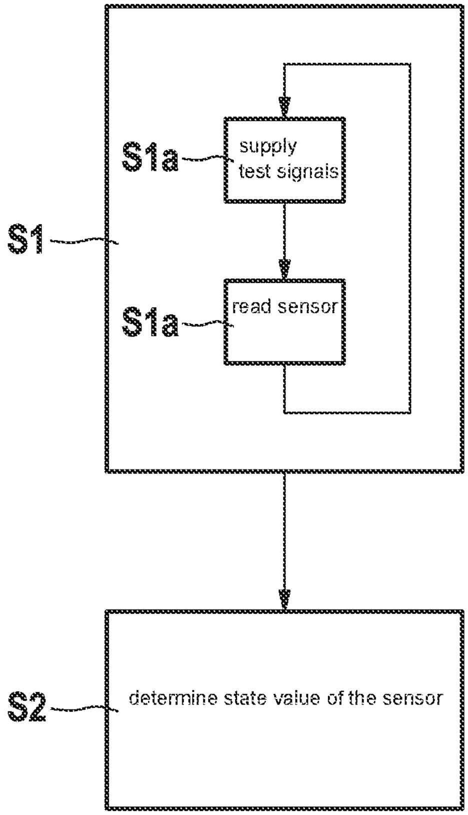
FIG. 5 shows a flow chart which forms the basis of a method for testing a sensor according to a specific embodiment of the present invention.

FIG. 5 shows a flow chart which forms the basis for a method for testing a sensor 2 according a specific embodiment.

The method may essentially comprise any of the steps which have already been described in connection with the testing apparatus 1. Accordingly, the sensor system, and in particular the testing apparatus 1, may also comprise any components required to realize the method described below.

Step S1 involves alternately supplying test signals to the sensor 2 (step S1*a*) and reading the sensor (step S1*b*) to ascertain a sensor value.

Then, in step S2, a state value of the sensor 2 is determined. This state value is determined in particular using the ascertained sensor values. As already described, the state values may be, for example, a damping property, a frequency characteristic, a resonance frequency or the like.

To determine the state value, the ratio between the first time period t1, in which the sensor 2 is excited, and the second time period t2, in which the sensor 2 is read, varies. In particular, a corresponding sensor value is ascertained for different time intervals t1 in which the sensor 2 is excited. The state value of the sensor 2, for example the frequency response or a damping property, is then ascertained by analyzing the resultant sensor values for different first time intervals t1.

In summary, the present invention relates to a testing apparatus and a testing method for a sensor, in particular a sensor having a PT2 behavior. To this end, provision is made to alternately excite the sensor with an excitation signal and then read the sensor. By varying the ratio of the periods between the excitation and the reading of the sensor, characteristic properties of the sensor, such as damping behavior, frequency response or the like, may be ascertained.

What is claimed is:

1. A testing apparatus for a sensor, comprising:

a control device configured to supply a test signal to the sensor and to subsequently read the sensor to ascertain a sensor value, wherein the control device is configured to supply the test signal to the sensor multiple times in succession, each for a predetermined first time period, and the sensor is subsequently read during a predetermined second time period, wherein the control device is further designed to vary the first predetermined time period for supplying the test signal to the sensor and to ascertain a corresponding sensor value for at least two different first time periods in each case;

wherein the control device is configured to determine a state value of the sensor using the ascertained sensor values for the at least two different first time periods, wherein the control device is configured to repeat supplying the test signal and reading the sensor until a stationary sensor value corresponding to a steady-state response of the sensor being periodically excited is produced, and wherein stationary sensor values for the at least two different first time periods are used to determine a damping property of the sensor.

2. The testing apparatus as recited in claim 1, wherein the control device is configured to provide a predetermined electric voltage at the sensor to excite the sensor.

3. The testing apparatus as recited in claim 1, wherein the control device is configured to ascertain the damping property of the sensor using the ascertained sensor values for the at least two different first time periods.

4. The testing apparatus as recited in claim 1, wherein the control device is configured to adjust an operating parameter using the ascertained sensor values for the at least two different first time periods.

5. The testing apparatus as recited in claim 1, wherein the control device includes an application-specific integrated circuit.

6. A sensor system, comprising:

a sensor configured to provide an output signal which corresponds to a physical parameter; and a testing apparatus including:

a control device configured to supply a test signal to the sensor and to subsequently read the sensor to ascertain a sensor value, wherein the control device is configured to supply the test signal to the sensor multiple times in succession, each for a predetermined first time period, and the sensor is subsequently read during a predetermined second time period, wherein the control device is further designed to vary the first predetermined time period for supplying the test signal to the sensor and to ascertain a corresponding sensor value for at least two different first time periods in each case, wherein the control device is configured to determine a state value of the sensor using the ascertained sensor values for the at least two different first time periods, wherein the control device is configured to repeat supplying the test signal and reading the sensor until a stationary sensor value corresponding to a steady-state response of the sensor being periodically excited is produced, and wherein stationary sensor values for the at least two different first time periods are used to determine a damping property of the sensor.

7. The sensor system as recited in claim 6, wherein the sensor includes a micro- electromechanical system.

8. The sensor system as recited in claim 7, wherein the sensor includes an acceleration sensor.

9. The sensor system as recited in claim 6, wherein the sensor includes a cavity filled with a medium, and wherein the testing apparatus is configured to detect a leak in the cavity filled with the medium.

10. A method for testing a sensor, comprising the following steps:

alternately for multiple times: supplying a test signal to the sensor and reading the sensor to ascertain a sensor value; and determining a state value of the sensor using the ascertained sensor values;

wherein the test signal is supplied to the sensor the multiple times in succession each for a predetermined first time period and the sensor is subsequently read during a predetermined second time period, wherein the first predetermined time period for supplying the test signal to the sensor is varied, and a corresponding sensor value is ascertained for at least two different first time periods in each case, and the state value of the sensor is ascertained using the ascertained sensor values for the at least two different first time periods, wherein the control device is configured to repeat supplying the test signal and reading the sensor until a stationary sensor value corresponding to a steady-state response of the sensor being is produced, and wherein stationary sensor values for the at least two different first time periods are used to determine a damping property of the sensor.

* * * * *